United States Patent [19]

Murphy et al.

[11] Patent Number: 5,184,984
[45] Date of Patent: Feb. 9, 1993

[54] CHAIN CATCHER FOR BICYCLES

[76] Inventors: John P. Murphy; Richard J. Murphy, both of 2609 Riverbend Ct., Fort Collins, Colo. 80525

[21] Appl. No.: 770,321

[22] Filed: Oct. 2, 1991

[51] Int. Cl.⁵ .............................................. F16H 7/00
[52] U.S. Cl. ................................................... 474/140
[58] Field of Search ............... 474/101, 111, 140, 144, 474/145

[56] References Cited

U.S. PATENT DOCUMENTS 1,348,240  8/1920  Pieper et al. ...................... 474/140
4,960,402 10/1990  Klein et al. ..................... 474/140 X Primary Examiner—Thuy M. Bui

[57] ABSTRACT

Chain hanger devices are described for attachment to a bicycle frame for supporting and retaining the drive chain vertically and laterally when the rear wheel and drive sprocket are removed from the frame. The hanger devices engage the chain without requiring manual manipulation of the chain. The rear wheel can be inserted into the frame again without physically handling the chain.

13 Claims, 4 Drawing Sheets

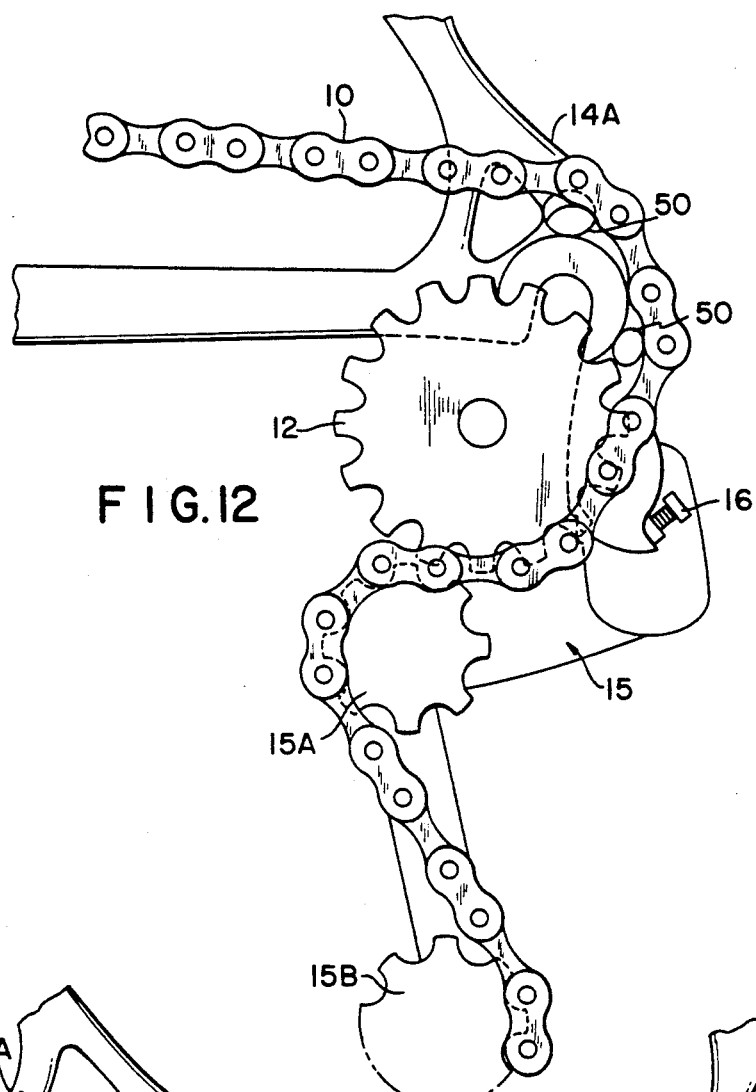
FIG.12
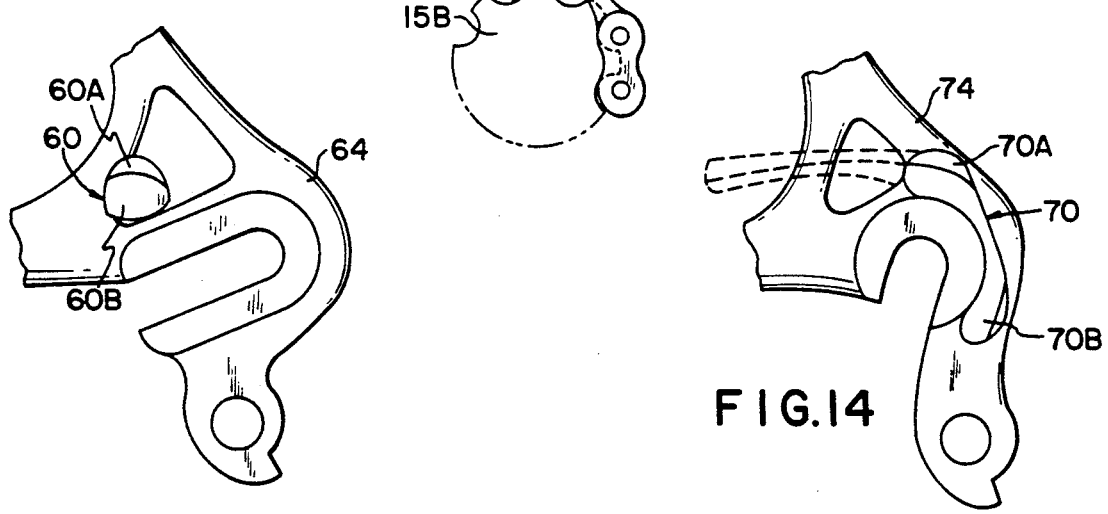
FIG.13
FIG.14

CHAIN CATCHER FOR BICYCLES

FIELD OF THE INVENTION

This invention relates to bicycles. More particularly, this invention relates to techniques and devices for use in holding or retaining the drive chain on a bicycle while removing the rear wheel.

BACKGROUND OF THE INVENTION

When the rear wheel of a conventional bicycle is removed (e.g., in order to change a tube or the tire itself), the drive chain must be removed from the drive sprocket. Typically the chain is dirty and greasy. Thus, one must ordinarily handle the chain both when removing the rear wheel and then again when installing the rear wheel on the bicycle after it has been repaired.

Aside from the fact that the chain may be dirty and greasy, the task of removing and replacing the rear wheel requires one to properly position the chain so that it properly engages the drive sprocket when the rear wheel is replaced. Also, when the rear wheel is removed from the bicycle, the chain may fall to the ground or become entangled. This is very undesirable. In general the handling of the chain when removing or installing the rear wheel is rather cumbersome and difficult.

This problem was addressed in U.S. Pat. No. 3,840,251 where there is described a bracket device which conforms to the periphery of the chain sprocket. The device includes an edge or flange which is perpendicular to the axle. By manipulation of the device, the chain is said to be supported by the device when the rear wheel is removed from the bicycle. The intended use of the bracket requires that it be properly manipulated to first engage the chain and then to disengage the chain when the rear wheel is installed on the bicycle again. It is very doubtful that such bracket device would be effective in engaging the chain and removing it from the sprocket because engagement of the chain on the rear side of the sprocket (centrally of the engagement arc) as the wheel is dropped will cause the chain to engage the sides of the sprocket very tightly. This binding would prevent the removal of the rear sprocket from the frame. It would be possible to remove the rear sprocket and then manually lift the chain off the sprocket and hang it on the bracket device, but that would be very cumbersome.

Another type of device is described in U.S. Pat. No. 4,509,767, where the device is referred to as chain hanger comprising an elongated body having a driving head and a drill bit on opposite ends. The device is installed on the bicycle seat stay above the rear wheel sprocket. When it is desired to remove the rear wheel from the bicycle frame, the chain must be manually lifted upwardly and placed onto the device. Thus, it is necessary to handle the chain to lift it onto and off of the device when removing the rear wheel and then installing the wheel again. Also, the chain must be forced out of line laterally in order to force the chain around the end of the hanger.

Various chain holding and locking devices are described in U.S. Pat. Nos. 2,165,377; 3,132,878; and 2,636,717. However, none of such patents describe or suggest devices or techniques which would be suitable for use on bicycles to support a drive chain.

There has not heretofore been provided a chain hanger device which is simple and effective for retaining and supporting a bicycle chain when removing the rear wheel of a bicycle.

SUMMARY OF THE PRESENT INVENTION

In accordance with one embodiment of the present invention there is provided a device for attachment to the horizontal chainstay tube of a bicycle. The device is attached to the tube just forwardly of the chain sprocket. The device includes a ledge projecting generally horizontally away from the tube and generally perpendicular (in a horizontal plane) to the line of the drive chain.

When the rear wheel of the bicycle is removed from the frame, the upper portion of the chain loop is allowed to rest upon the ledge where it is safely and effectively supported. The chain engages the ledge without any need for manually grasping the chain. When the rear wheel is installed on the frame again, the chain is engaged by the drive sprocket and is easily lifted off the ledge, without having to manually grasp the chain.

Thus, the device of this invention is stationary on the frame of the bicycle and does not require any special manipulation or adjustment in order to engage or disengage the drive chain during removal of the rear wheel or subsequent installation thereof on the frame.

In a preferred embodiment the device of the invention comprises a horizontally disposed ledge portion and attachment means for attaching the device to the horizontal chainstay tube of a bicycle. The ledge portion projects away from the tube in the direction of the chain. The outer end of the ledge includes an upwardly projecting lip.

When the rear wheel of the bicycle is removed from the frame, the drive chain comes into contact with the ledge and is supported there. This prevents the chain from falling to the ground and becoming entangled. Use of the device of the invention also avoids the need to grasp the chain and manipulate it to a particular position.

In another embodiment of this invention there is provided a hanger device which is secured to the drive side chainstay tube and dropout assembly of a bicycle frame. This device comprises an upwardly extending flange which preferably is angled away from the dropout assembly of the frame and toward the drive sprocket. The upper edge of the flange is very narrow. The flange may be tapered.

The outer edge of the flange intercepts the chain when the rear wheel of the bicycle is removed from the frame. When the chain is thus engaged, it is held and supported vertically by the hanger.

The hanger device of this invention contains no moving parts. It remains stationary on the frame at all times. It does not interfere in any way with the normal operation of the bicycle.

When transporting a bicycle, repairing or replacing a tube, or just working on a bicycle, it is frequently necessary to remove the rear wheel. Accordingly, the chain hanger devices of this invention are very useful on all bicycles.

Also, when competing in races, wheel exchanges are often necessary (due to flat tires or damage to the wheel). The time allotment for making changes is minimal. Consequently, the chain hanger devices of this invention are especially useful on racing bicycles also. No personal physical contact with the chain itself is required. Also, the chain does not drop to the ground or become entangled.

Another advantage of certain embodiments of the hanger devices of the invention is that they can be easily affixed to existing bicycle frames regardless of the size of frame tubes, gearing variations and derrailleur combinations, frame dimensions, etc. The hanger device can be easily installed and adjusted by the user without need for special tools or skills.

The hanger devices of this invention can also be installed on bicycle frames as original equipment, if desired. The hanger devices may be affixed to the frame, for example, by means of welding, brazing, riveting, adhesive bonding etc. The hanger device may even be cast as an integral part of the dropout assembly.

Other advantages of the hanger devices of this invention will be apparent from the following detailed description.

BRIEF DESCRIPTION OF THE DRAWINGS

The invention is described in more detail hereinafter with reference to the accompanying drawings, wherein like reference characters refer to the same parts throughout the several and in which:

FIG. 12 is a side elevational view showing the manner in which the hanger device of FIG. 9 engages the chain when the rear wheel is removed;

FIG. 13 is a side elevational view illustrating a hanger device affixed to the dropout assembly of a bicycle frame; and FIG. 14 is a side elevational view illustrating another embodiment of hanger device of the invention.

DETAILED DESCRIPTION OF THE INVENTION

Figure 1:
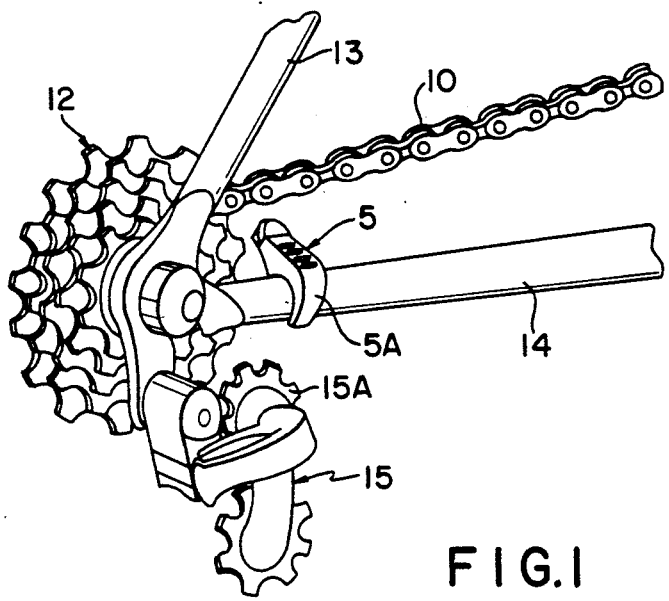
FIG. 1 is a perspective view illustrating one embodiment of a hanger device of the invention mounted on the horizontal chainstay tube of a bicycle frame.
Figure 2:
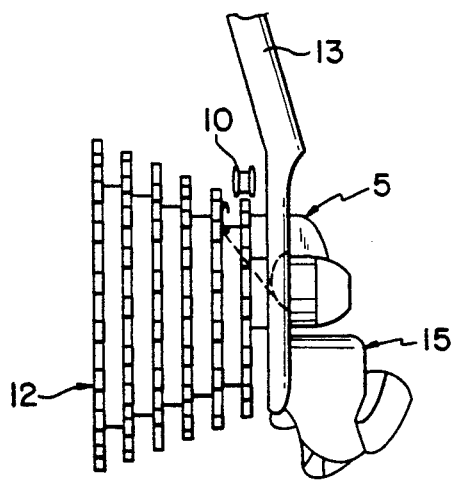
FIG. 2 is a rear elevational view of the assembly of FIG. 1.
Figure 3:
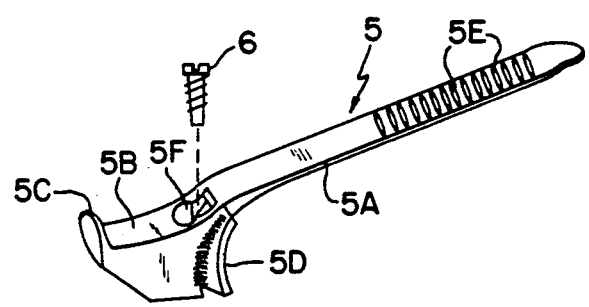
FIG. 3 is a perspective view of the hanger device shown in FIG. 1.
Figure 4:
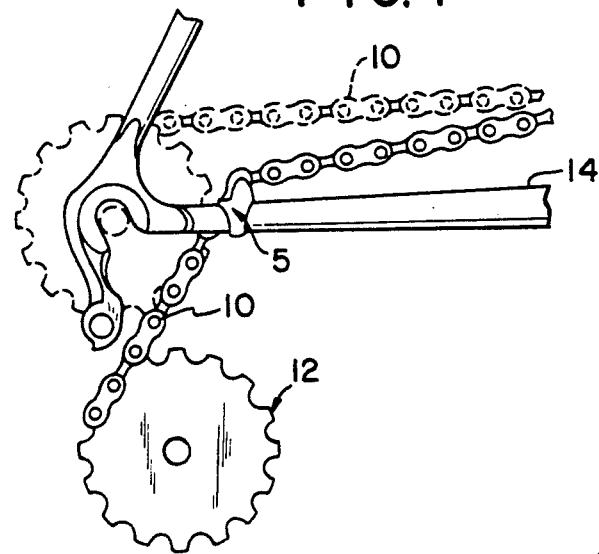
FIG. 4 illustrates operation of the hanger device when the rear wheel of the bicycle is removed from the frame.

In FIGS. 1-4 there is illustrated one embodiment of chain hanger device 5 of the invention. In FIGS. 1, 2 and 4 the device is shown attached to horizontal chainstay tube 14 of a bicycle frame. The frame seat stay is designated as 13.

The hanger device includes a generally horizontal ledge portion 5B which extends away from the horizontal chainstay tube 14 in the direction of the drive chain 10. The outer end of the ledge portion includes an upwardly projecting lip 5C. Flange 5D extends along tube 14 to assist in preventing the chain from scratching tube 14 when the rear wheel is removed. Although the ledge portion is illustrated as having a planar upper surface, this is not required. It may be curved (i.e., convex) if desired.

The device also includes attachment or mounting means for securing the device to the tube 14. In the embodiment shown in FIGS. 1-4 there is illustrated a flexible band 5A which is connected at one end of the body portion of the hanger device. The opposite end of the band 5A is able to be folded around the tube 14 and then brought through a slotted aperture 5F in the body portion. Preferably band 5A is composed of tough plastic (e.g., nylon).

A threaded screw 6 fits into the aperture 5F. Band 5A includes spaced slots or grooves 5E which are engaged by the threads of the screw 6. As the screw is rotated, the threads engage the grooves 5E and draw the band tightly around the tube 14. If desired, double-sided adhesive tape may be positioned on the tube 14 before the hanger 5 is attached. Because the band is adjustable, it will accommodate different diameters of chainstay tube 14.

When the sprocket 12 of the rear wheel of the bicycle is loosened and detached from the frame and dropped downwardly, the chain 10 is automatically caught and supported by the hanger device 5. This is shown in FIG. 4. Then the sprocket 12 can be disengaged from the chain.

The hanger device 5 fully supports the chain 10 vertically and laterally with the help of the idler sprocket 15A of the derrailleur assembly. Then when it is time to re-attach the rear wheel and sprocket to the frame, the chain is already in the proper position for re-engagement to the sprocket 12.

The hanger device 5 is positioned on tube 14 just forwardly of the position of the rear sprocket 12, as illustrated. The hanger device may be positioned farther forwardly on tube 14, if desired. For example, it may be positioned a few inches further away from the rear sprocket 12, although the preferred position is as illustrated in FIGS. 1 and 4.

Figure 5:
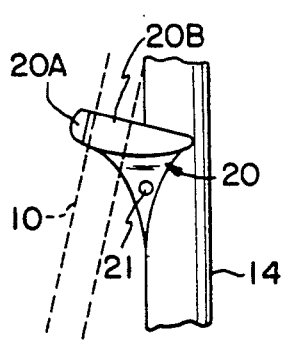
FIG. 5 is a top view of another hanger device of the invention affixed to the horizontal chainstay tube of a bicycle frame.

FIG. 5 is a top view of another embodiment of hanger device 20 of the invention. This embodiment includes a generally flat ledge portion 20B having an upwardly projecting lip 20A on the outer end thereof. The device may be metal and is secured to tube 14 by means of screw 21 which extends through an aperture in the flange portion of the device and into an aperture in tube 14. Alternatively, the device may be secured to steel tubes by brazing or welding and to aluminum tubes by riveting or with epoxy adhesive. Dotted lines illustrate the position of the chain 10 when it is supported by the device 20. Because tube 14 is oriented at an angle of approximately 7° relative to the path of the drive chain, the ledge portion of the hanger is not exactly perpendicular to the tube 14 centerline.

Figure 6:
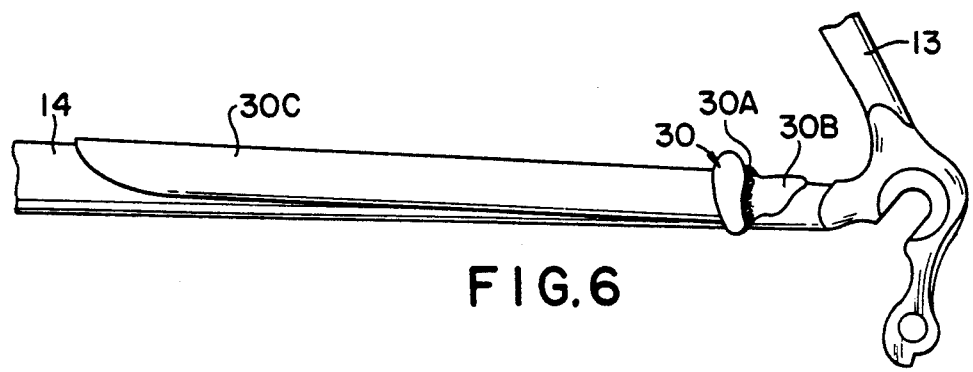
FIG. 6 is a side elevational view of another embodiment of hanger device of this invention.

FIG. 6 is a side elevational view of yet another embodiment of hanger device 30 of this invention secured to chainstay tube 14. The device includes a ledge portion 30A. Flange 30B extends from the body portion of the device along the tube 14 toward the rearward end of the tube. An elongated flange portion 30C extends forwardly along tube 14 to further protect the tube 14 from abrasion from the chain of the bicycle. The length of the flange portion 30C may vary, as desired.

Figure 7:
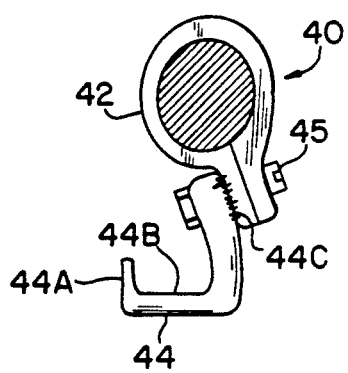
FIG. 7 is a rear elevational view of another embodiment of hanger device of this invention.
Figure 8:
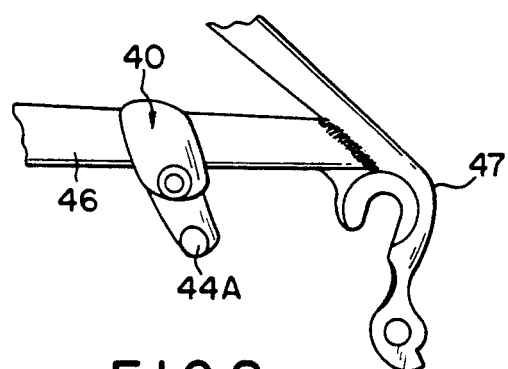
FIG. 8 is a side elevational view of a bicycle frame with the hanger device of FIG. 7 mounted thereon.

FIGS. 7 and 8 illustrate yet another embodiment of hanger device 40 of this invention which comprises a band 42 for attachment of the device to horizontal chainstay tube 46. Suspended below band 42 is a hanger member 44 having a ledge portion 44B having an upstanding lip 44A on the outer end thereof. A bolt 45 secures the hanger 44 to band 42. If desired, the abutting faces of hanger 44 and band 42 may be serrated or grooved such that the angular position of hanger 44 relative to band 42 may be changed and then fixed in any desired position by tightening bolt 45.

The hanger device shown in FIGS. 7 and 8 is especially useful on bicycles which have an elevated chainstay. As shown in FIG. 8, the chainstay 46 is positioned above the point where the rear sprocket attaches to seat stay 47.

The dimensions of the hanger device of the invention may vary. Generally speaking, the length of the ledge portion is at least equal to the width of the drive chain and preferably is a few percent greater than the width of the chain. The length of the ledge portion may be as great as about 1.5 inches or more, if desired, so that it will catch the chain from any shifted position.

The hanger device may be made of various materials, although durable plastic (e.g., nylon, Delrin, etc.) may be preferred for retro-fitting the device onto existing bicycles. The hanger device may be mounted on the horizontal chainstay tube in a variety of manners. It may be attached to the tube at the factory at the time of original manufacture, or it may be attached later after purchase by the consumer.

Figure 9:
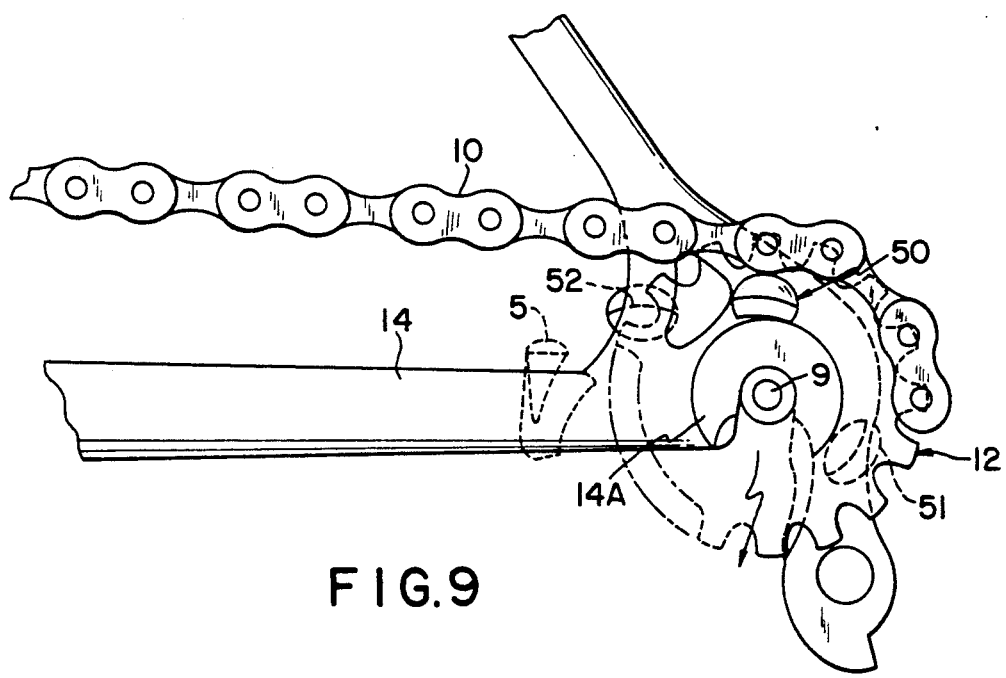
FIG. 9 is a side elevational view illustrating another embodiment of hanger device of this invention and also illustrating plural positions for hanger devices.
Figure 10:
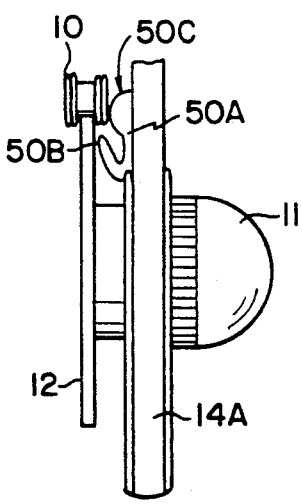
FIG. 10 is a rear elevational view showing the hanger device of FIG. 9.
Figure 10A:
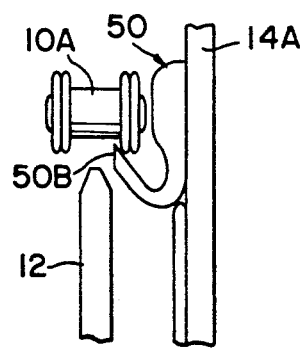
FIG. 10A is a rear elevational view showing the manner in which the hanger device of FIG. 9 engages the chain when the rear wheel is removed from the dropout assembly.

Another embodiment of hanger device 50 of the invention is shown in FIGS. 9, 10 and 10A. In this embodiment the hanger device comprises a mounting portion 50A and an outwardly extending flange portion 50B. The outer edge 50B of the flange is tapered and is very thin. The mounting portion secures the hanger device to the dropout assembly portion 14A of frame 14 of the bicycle. For example, the device may be secured to the dropout assembly by welding, brazing, adhesive, etc. Preferably the hanger device is composed of metal.

The flange portion 50B extends towards the gear sprocket 12 in a manner such that the flange is very close to but not touching the sprocket. The purpose of the flange portion is to engage the chain 10 when the rear wheel is removed from the frame. This is illustrated in FIG. 10A. Preferably the device includes an upper button or raised portion 50C which serves to prevent the chain from falling completely into the area between the flange and the mounting portion 50A and binding there. The raised portion 50C also keeps the chain aligned far enough to the left on the flange so that the space between the rollers and plates of the chain can be engaged by the sprocket teeth.

Preferably the raised portion 50C extends outwardly to an extent such that at least half of the length of the roller 10A is to the left of the flange 50B (see FIG. 10A). Even more preferably, at least about 85% of the length of the roller is positioned to the left of the flange.

Preferably the flange 50B can be bent inwardly or outwardly at the time of installation to accommodate a particular sprocket. It is also preferable for button 50C to be adjustable in thickness.

As shown in FIG. 9, the preferred location for hanger device 50 is near the top of the dropout assembly 14A. The particular dropout assembly shown there includes a nearly vertical slot for receiving the axle 9. Axle clamp nut 11 is threaded on the end of the axle. The axle and sprocket 12 drop nearly straight downwardly (in the direction of the arrow) to be removed from the dropout assembly. The hanger device 50 engages the chain 10 when the sprocket and rear wheel are removed.

The hanger device may be located at other locations on the dropout assembly, if desired. For example, it may be located at position 52 which is forward of the position 50. It may also be located at position 51 which is further rearwardly on the dropout assembly. If desired, there may be a plurality of such hanger devices mounted to the dropout assembly. It is also possible to include a hanger device 5 of the type described in connection with FIGS. 1-4.

Figure 11:
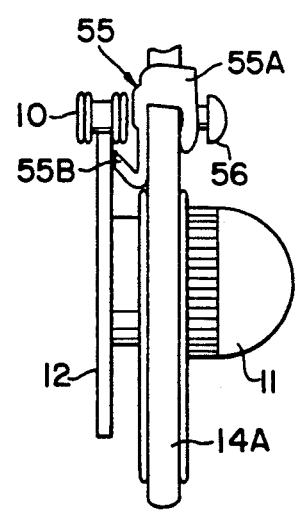
FIG. 11 is a rear elevational view showing another embodiment of hanger device of the invention.

FIG. 11 illustrates another embodiment of hanger device 55 which is useful in this invention. This embodiment of hanger device includes a mounting bracket or clamp portion 55A. A bolt or screw 56 is used to secure the clamp portion to the dropout assembly. The device also includes a flange portion 55B which extends outwardly and upwardly toward the sprocket 12 so that it can engage the chain 10 when the sprocket is detached from the dropout assembly.

FIG. 12 illustrates the chain position on two hanger devices 50 which are secured to dropout assembly 14A at two separate locations. One location is at the upper portion of the dropout assembly and the other location is at the rear portion of the dropout assembly. The two hanger devices support and retain the chain in the position shown when the sprocket 12 is removed. The chain 10 remains trained around the two sprockets 15A and 15B of the derrailleur assembly. Spring tension on the assembly is adjusted by means of screw 16. The derrailleur assembly supports the chain and tensions it. The spring tension causes the idler assembly to be directly in the way of the sprocket and axle when the wheel is removed. Thus, the derrailleur assembly is pivoted rearwardly out of the path of the sprocket in order to remove the rear wheel, after which the derrailleur assembly is allowed to spring back and maintain chain alignment.

FIG. 13 illustrates another hanger device 60 of the invention which is brazed or welded to the dropout assembly 64. The device includes a mounting portion 60A and an outwardly flaring flange portion 60B. In this assembly the slot for receiving the axle is sloped forwardly.

FIG. 14 illustrates yet another embodiment of hanger device 70 on a dropout assembly 74. In this embodiment the mounting portion 70A is elongated, as is the flange portion 70B. The primary chain support portions are at opposite ends of the device. If desired, the flange could extend forwardly from its upper end in a generally-horizontal manner. It could even extend forwardly of the dropout assembly, if desired, as illustrated by the dotted lines in FIG. 14.

Other variants are possible without departing from the scope of this invention. The various embodiments of chain hanger devices described herein perform the same function, i.e., catching the chain when the rear drive wheel is removed from the frame and holding the chain in such alignment that the drive sprocket will re-engage the chain properly with no manipulation or handling of the chain when the wheel is replaced. The hanger device may be affixed to the horizontal chainstay tube slightly forwardly of the sprocket or it may be secured to the inside of the dropout assembly adjacent the sprocket. The hanger device is effective throughout a range of positions, as illustrated in the drawings. Once the chain is caught by the hanger device it is held and supported vertically and laterally. A combination of hanger devices may also be used, if desired. The types of materials used for the hanger devices may vary, depending upon the strength, hardness and durability desired.

What is claimed is:

1. A chain hanger device for attachment to the horizontal chainstay tube of a bicycle, said device comprising a horizontally disposed ledge portion and attachment means for attaching said device to said tube, wherein said ledge portion includes an outer end, and further comprising a lip member projecting upwardly from said outer end.

2. A device in accordance with claim 1, wherein said ledge portion comprises a planar upper face.

3. A device in accordance with claim 1, wherein said attachment means comprises a band for encircling said tube.

4. A device in accordance with claim 3, wherein said device comprises a body portion having an opening therethrough, wherein said band includes one end which is secured to said body portion and another end which is received in said opening, and further comprising a threaded screw which is received in said opening to engage said band.

5. A chain hanger device for attachment to an inside surface of a dropout assembly of a bicycle frame, said device comprising a mounting portion for attachment to said inside surface and an outwardly projecting flange portion, wherein said flange portion includes a tapered outer edge.

6. A device in accordance with claim 5, wherein a groove is defined between said flange portion and said mounting portion.

7. In a bicycle of the type including a frame having a horizontal chainstay tube, a dropout assembly for supporting a drive sprocket, and a drive chain which engages said sprocket, the improvement which comprises a hanger device which is attached to said horizontal chainstay tube, wherein said device comprises a horizontally disposed ledge portion having an outer end, and further comprising a lip member projecting upwardly from said outer end; wherein when said drive sprocket is removed from said dropout assembly said hanger engages said chain and supports it vertically and laterally.

8. The improvement in accordance with claim 7, wherein said ledge portion comprises a planar upper face.

9. The improvement in accordance with claim 7, wherein said attachment means comprises a band for encircling said tube.

10. The improvement in accordance with claim 9, wherein said device comprises a body portion having an opening therethrough, wherein said band includes one end which is secured to said body portion and another end which is received in said opening, and further comprising a threaded screw which is received in said opening to engage said band.

11. In a bicycle of the type including a frame having a dropout assembly for supporting a drive sprocket, and a drive chain which engages said sprocket, wherein said dropout assembly includes a vertical inside surface, the improvement which comprises a hanger device attached to said inside surface, wherein said hanger device comprises an outwardly projecting flange portion, wherein said flange portion includes a tapered outer edge; wherein when said sprocket is removed from said dropout assembly said flange portion engages said chain and supports it vertically and laterally.

12. The improvement in accordance with claim 11, wherein a groove is defined between said flange portion and said mounting portion.

13. The improvement in accordance with claim 12, further comprising means for maintaining lateral alignment of said chain relative to said frame.

* * * * *